US007229140B2

(12) United States Patent
Page et al.

(10) Patent No.: US 7,229,140 B2
(45) Date of Patent: Jun. 12, 2007

(54) PRE-TENSIONED SPRING TRACK TENSIONING SYSTEM

(75) Inventors: James H. Page, Bottineau, ND (US); William A. Wright, Gwinner, ND (US); Edward Larson, Milnor, ND (US)

(73) Assignee: Clark Equipment Company, Montvale, NJ (US)

( * ) Notice: Subject to any disclaimer, the term of this patent is extended or adjusted under 35 U.S.C. 154(b) by 415 days.

(21) Appl. No.: 10/816,490

(22) Filed: Apr. 1, 2004

(65) Prior Publication Data

US 2005/0218721 A1  Oct. 6, 2005

(51) Int. Cl.
 *B62D 55/30* (2006.01)
(52) U.S. Cl. ............. 305/151; 305/152; 267/289; 267/291
(58) Field of Classification Search ............. 305/143, 305/144, 145, 146, 151, 152, 153, 154; 180/9.1, 180/9.56; 267/289, 291
See application file for complete search history.

(56) References Cited

U.S. PATENT DOCUMENTS

| | | | | |
|---|---|---|---|---|
| 2,054,533 | A | 9/1936 | Baker et al. ............. 74/242.14 |
| 2,506,619 | A | 5/1950 | Schwartz ................. 305/10 |
| 2,683,064 | A | 7/1954 | Land | |
| 2,707,522 | A * | 5/1955 | Sibley .................. 180/9.62 |
| 2,717,813 | A | 9/1955 | Gardner ................. 305/9 |
| 3,082,043 | A | 3/1963 | Orton | |
| 3,332,725 | A * | 7/1967 | Reinsma .................. 305/153 |
| 3,744,857 | A | 7/1973 | Schoonover .............. 305/10 |
| 3,829,172 | A * | 8/1974 | Oestmann et al. ......... 305/147 |
| 3,915,509 | A | 10/1975 | Bell et al. ............... 305/10 |
| 3,915,510 | A | 10/1975 | Alexander .............. 305/10 |
| 3,920,286 | A | 11/1975 | Bell .................... 305/10 |
| 3,944,196 | A * | 3/1976 | Schwartzkopf ............ 267/4 |

(Continued)

FOREIGN PATENT DOCUMENTS

JP  55 156773 A  2/1981

(Continued)

OTHER PUBLICATIONS

Copy of European International Search Report from PCT/US2005/009914.
Copy of Written Opinion from PCT/US2005/009914.

*Primary Examiner*—Russell D. Stormer
(74) *Attorney, Agent, or Firm*—Michael Best & Friedrich LLP

(57) ABSTRACT

A pretensioned spring track tensioning system provides a two stage loading of a tension roller on the interior of a vehicle drive track. The two stage loading first loads the track under a lower tension load for normal operation, but when the track is highly loaded, such as when digging, or when debris is forced between the track member and its drive sprocket or guide rollers, the compression of the lighter spring will be stopped mechanically and a second heavier compression spring will provide the tension loading. The additional spring tension under unusual conditions prevents detracking of the track and buckling of the track. A lighter tension load during normal operations reduces the loads on bearings, particularly in relation to a drive motor. The tensioning system has particular adaptability to "high" drive type tracks which have a drive sprocket elevated above the tension roller.

10 Claims, 6 Drawing Sheets

U.S. PATENT DOCUMENTS

| | | | |
|---|---|---|---|
| 4,413,862 A | 11/1983 | Ragon | 305/10 |
| 4,874,052 A | 10/1989 | Purcell et al. | 180/9.1 |
| 4,881,786 A * | 11/1989 | Tonsor | 305/145 |
| 5,511,868 A | 4/1996 | Eftefield | 305/31 |
| 5,725,204 A * | 3/1998 | Yoshida | 267/289 |
| 6,305,762 B1 * | 10/2001 | Oertley | 305/145 |
| 6,322,171 B1 | 11/2001 | Fornes | 305/143 |

FOREIGN PATENT DOCUMENTS

| | | | |
|---|---|---|---|
| JP | 2001 180542 A | 5/2001 |
| JP | 02001180542 A | 7/2001 |

* cited by examiner

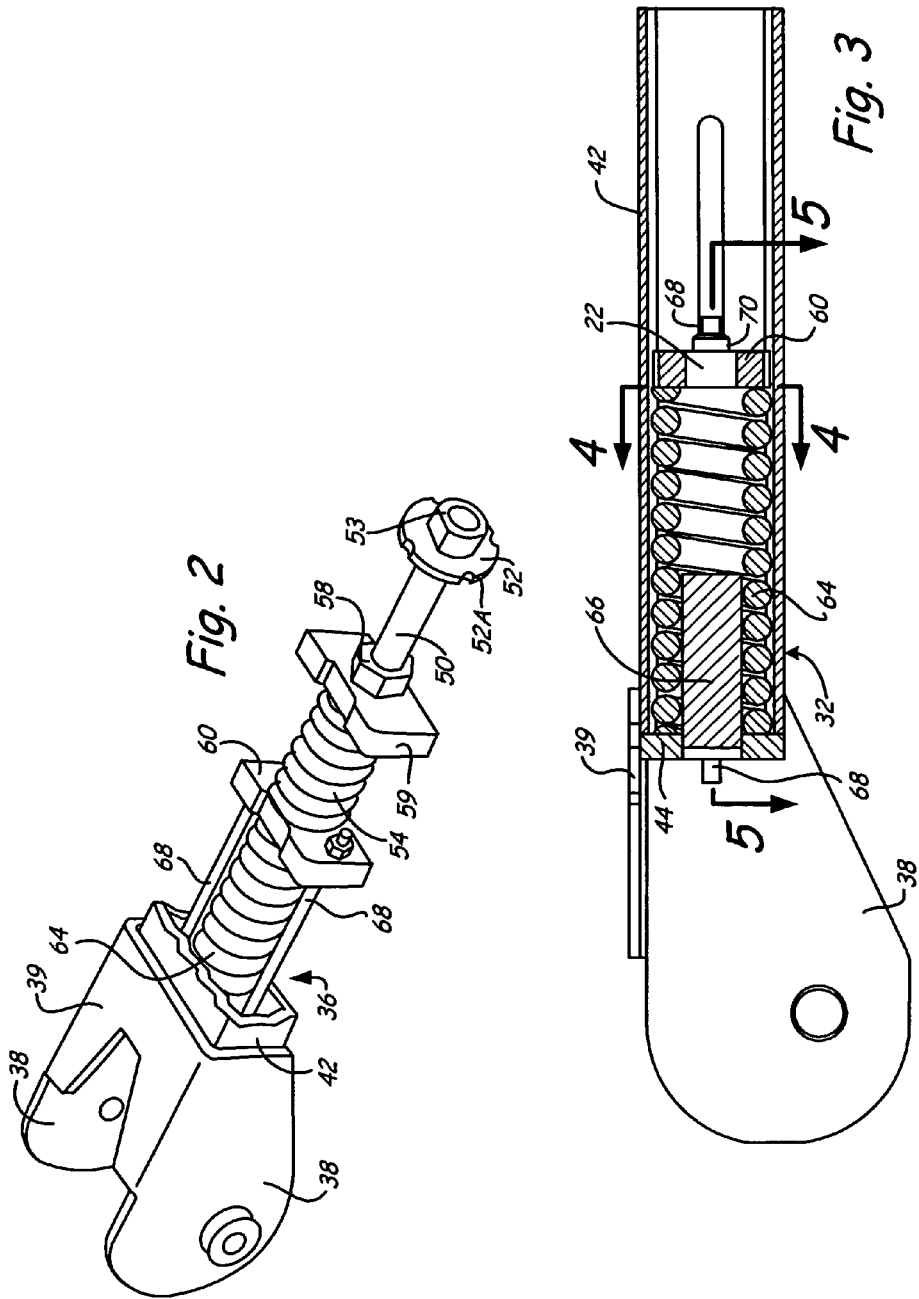

PRE-TENSIONED SPRING TRACK TENSIONING SYSTEM

BACKGROUND OF THE INVENTION

The present invention relates to a pre-tensioned spring for loading a track tensioning roller for a ground drive track on a track laying vehicle or track drive system that provides two different levels of tensioning loads. A lower track tension is provided for normal operation, and a higher track tension is provided to prevent detracking and buckling of the track during high tractive effort conditions or when debris is forced between the track and the drive sprocket, idlers or track support rollers.

Ground support and drive tracks are used in various vehicles, for good traction and flotation. The tracks are endless members driven by a drive wheel or sprocket, and supported on a plurality of rollers on a lower length of the track. The track has to be kept under tension, and heavy springs or hydraulic or grease filled cylinders have been used for such purposes.

Some track tensioners utilize two separate springs to attempt to provide for two-level tensioning. For example, springs provided in series, one of which is lesser force than the other, are utilized as a shock absorber in Japanese abstract No. JP 55156773. The assignee of the present application owns U.S. Pat. No. 6,322,171 which shows a spring loaded track tensioning assembly. However, a reliable two stage spring system is desired for providing a lower average track tension for normal use, and higher tension only when it is needed.

SUMMARY OF THE INVENTION

The present invention relates to a tensioner or tensioning roller for vehicle drive tracks, which has a two stage spring system for providing a lower spring load to cause track tension loading at a lower level under normal operating conditions. After initial movement of the tensioner against the initial or primary spring load, a second higher spring rate is provided to load the track to reduce movement of the tensioner, and thus reduce the likelihood of track buckling or the risks of detracking. Buckling of the track and detracking during higher track effort conditions, such as when digging or when debris is forced between the track member and its drive sprocket, roller or an idler is reduced.

The lower initial track tension reduces the bearing side load on the track supports, and in particular, loads on the motor bearing that is used in a motor driving the track drive sprocket. In most cases, the sprocket is attached right on the motor output shaft.

The present tension system has particular use in a "high" drive track arrangement where the drive sprocket is at the rear of the track and is elevated to be above the tensioning roller, so that the track forms a generally triangular configuration.

The present tensioner or tensioning roller is easily manufactured and installed, and is very reliable for providing the two stage loading. It is also lower cost than existing hydraulic or grease cylinder designs that are commonly utilized for track tensioning.

BRIEF DESCRIPTION OF THE DRAWINGS

FIG. 2 is a perspective view of the track tensioner removed from the track support frame with a slide broken away to show springs;

FIG. 3 is a sectional view of a track tensioner arm with the secondary or higher force spring in position in a slide;

DETAILED DESCRIPTION OF THE PREFERRED EMBODIMENTS

Figure 1:
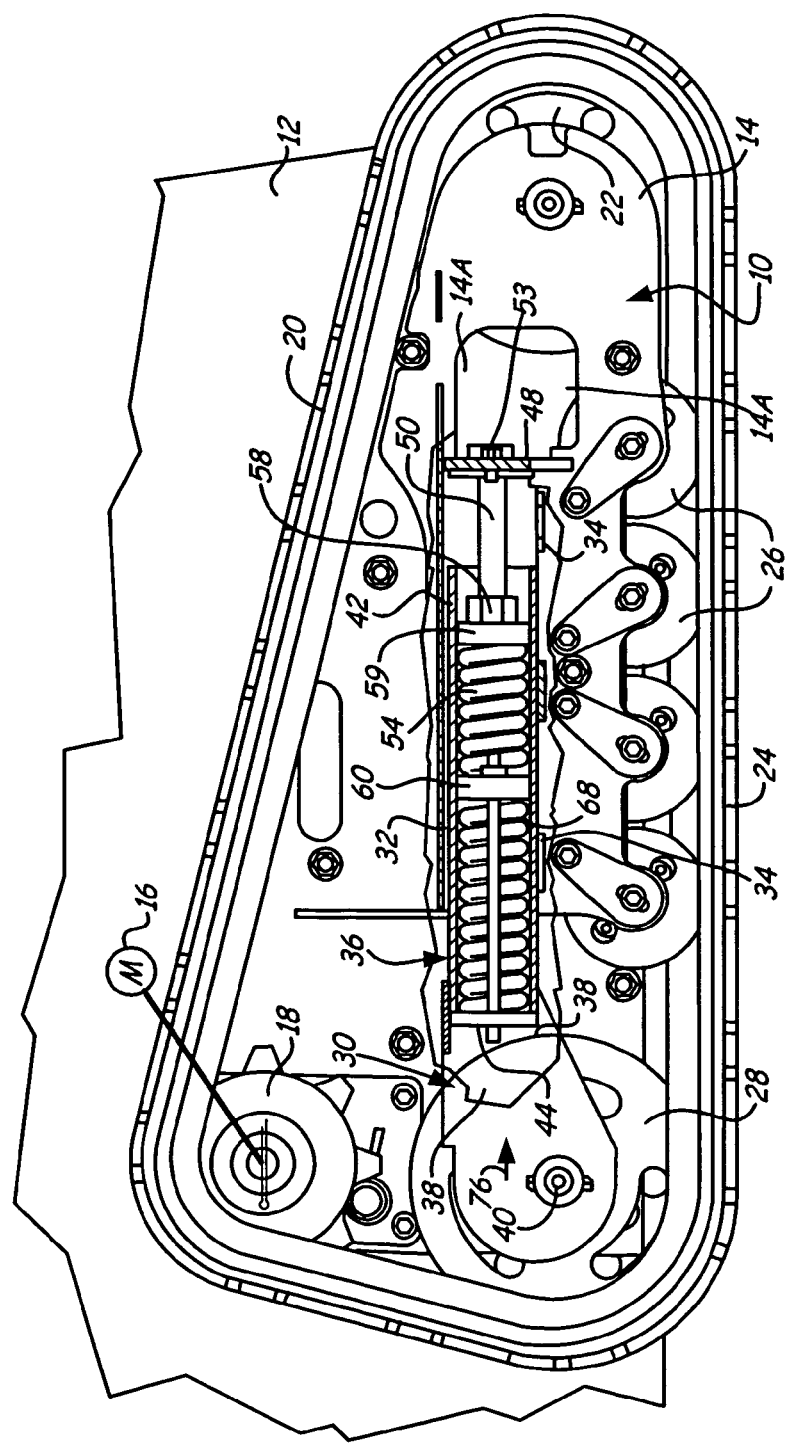
FIG. 1 is a schematic side elevational view of the typical track frame assembly with which the spring tensioner of the present invention finds particular use with parts broken to show the tensioner.

In FIG. 1, the track frame indicated generally at 10 is supported on a vehicle frame 12, such as a small utility loader, or other vehicle. The track frame has side plates 14, and as shown, a drive motor 16 is mounted on the track frame 10 and the output shaft of the motor 16 has a drive sprocket 18 drivably mounted thereon. The drive sprocket 18 in the form shown is at the upper side of the track frame 10, and an endless drive track shown at 20 extends downwardly in a forward direction from the drive sprocket 18 to a front idler roller 22. This front idler roller 22 is rotatably mounted on the track frame 10, and guides the track so that there is a ground engaging lower length section indicated at 24 that is supported on bogie wheels or track rollers 26 of conventional or any preferred design. The track 20, which is an endless track, is passed around a tensioner or tensioning roller 28, that is mounted onto a tension spring loading assembly 30 made according to the present invention.

The track frame has suitable cross members between side walls 14 such as wall 32, and also there are guides 34 that will support the track tensioner arm or slide 36. The track tensioner arm 36 includes a pair of flanges 38 that are joined with a cross plate 39. The flanges 38 are spaced apart to receive the track tensioner roller 28 on a suitable shaft 40. The shaft 40 can be mounted on suitable bearings, or can be a shaft that does not rotate, and the tensioning roller itself can be rotating on the shaft.

Figure 9:
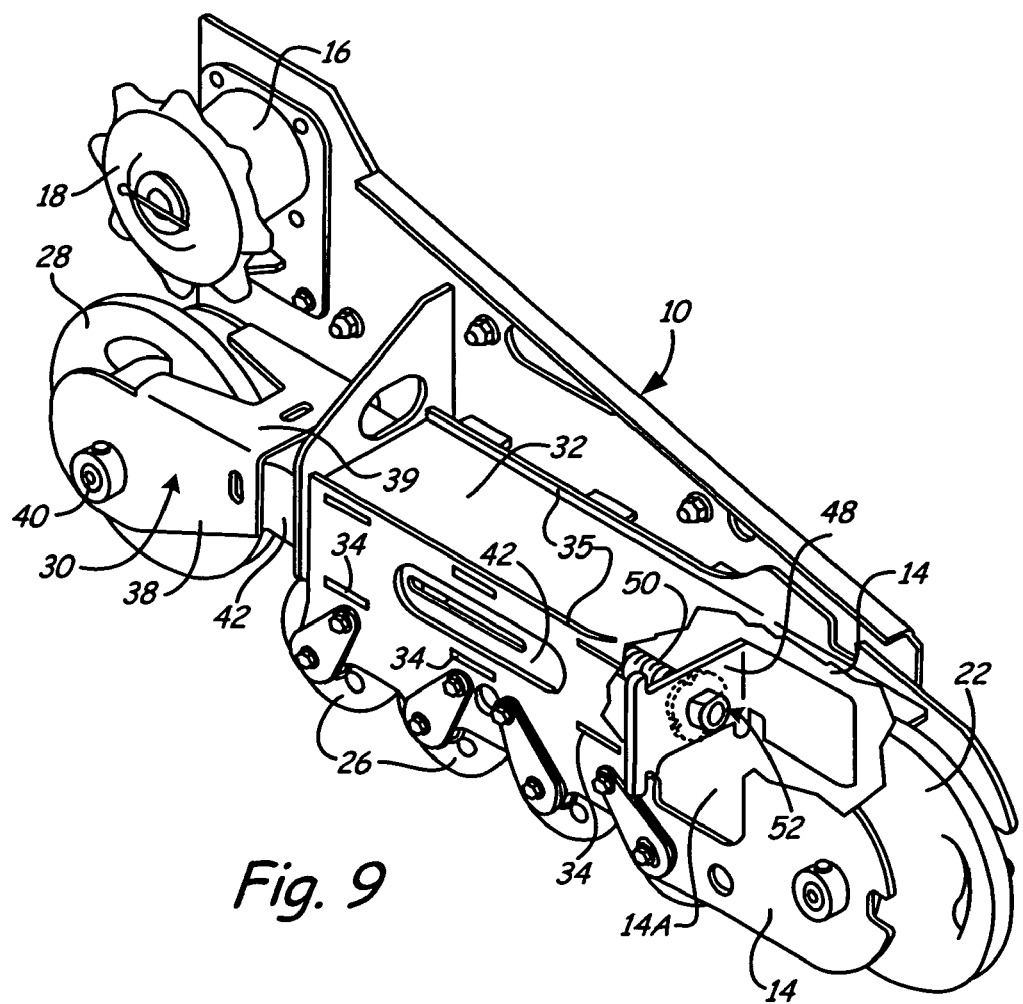
FIG. 9 is a fragmentary perspective view of a portion of a track frame showing a spring end support arrangement.

The tensioner arm 36 includes a tubular slide housing 42 that is rectangular in cross sectional shape and which will slide between the wall 32 and the guides 34 shown in FIG. 1. Guides 34 are spaced apart along the length of the slide housing to form a suitable guide and support for the slide housing 42. The perspective view of FIG. 9 shows the wall 32 with the slide housing shown in the support formed by wall 32 and guides 34.

The slide housing 42 has a fixed end member or base plate 44 (FIGS. 3 and 8) that are also part of a large spring assembly. The flanges 38 are fixed to slide housing 42 and end member 44. The track tensioning roller 28 is loaded to provide tension in the track with a spring assembly 46 that is within slide housing 42. The springs are used react or provide force on end member 44 which is reacted through a suitable end force reaction plate 48, as shown in FIG. 9, that is fixed relative to the side plates 14 of the track frame 10 (also see FIG. 8). A threaded rod 50 has an adjustment hub 52 fixed to one end. The hub 52 has a hexagon periphery nut 53 that fits through an opening in the end plate 48, and a circular flange 52A that bears against the inside surface of the end plate 48.

The threaded rod or shaft 50 extends rearwardly from end plate 48 into the slide housing 42. The spring assembly 46 includes a first relatively low force or light rate spring 54 that is supported over a fixed length tubular sleeve 56 (see FIG. 7) that surrounds the portion of the threaded shaft 50 between a threaded adjusting nut 58 that includes a rectangular flange or plate 59 that engages one end of first spring 54, and a slide plate or block 60 that forms part of a second or large spring assembly 62.

Figure 5:
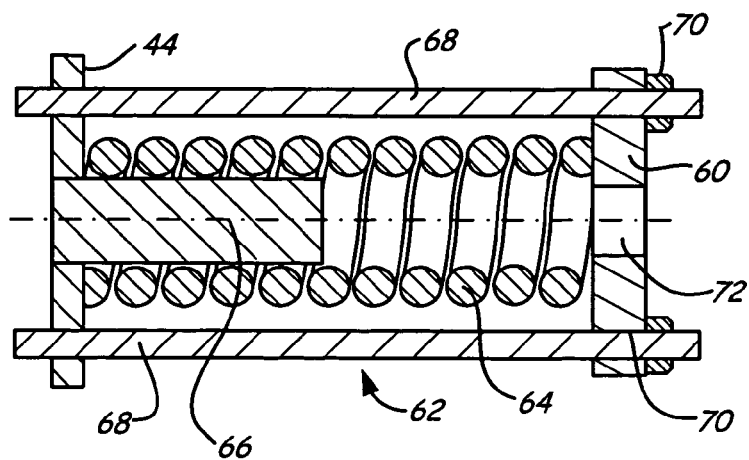
FIG. 5 is a sectional view of the higher force or secondary spring assembly taken along line 5—5 in FIG. 3 to illustrate the sliding arrangement for the movement of the spring.
Figure 6:
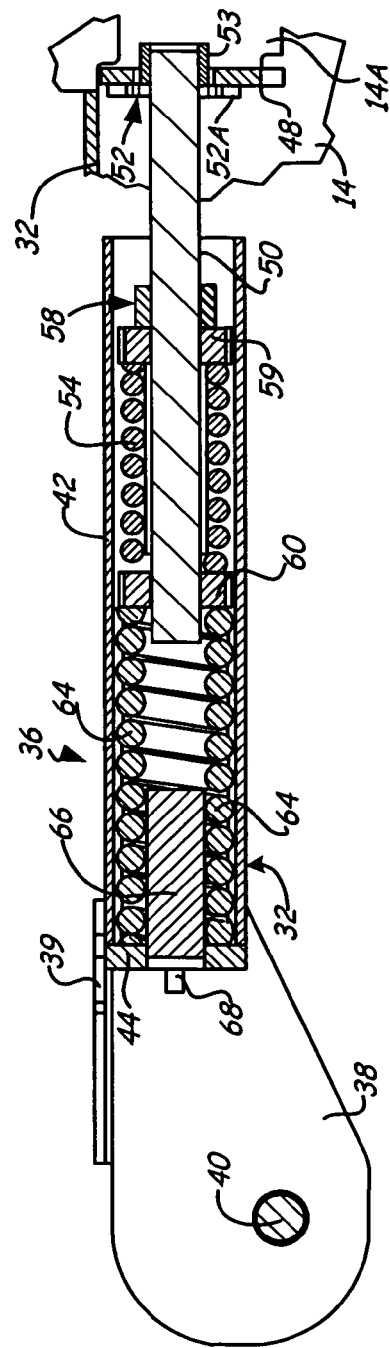
FIG. 6 is a sectional view of the two springs used for the tensioner in an assembly.

The large spring assembly 62 is shown in FIG. 3 and in FIGS. 5 and 6 in section. The spring assembly 62 includes a the end member or base plate 44, that was shown in FIGS. 1 and 3 and which is held or secured relative to the side plates 38 and the slide housing 42. Base plate 44 will react force from a second heavy duty or high rate spring 64 as load on the track increases, as will be explained.

The base plate 44 also carries a centering shaft 66 that fits within the second spring 64 to keep it in position between the base plate 44 and the slide plate 60. A pair of guide rods 68 are fixed to the base plate 44 by welding them in place or the like, but they slide through provided openings in the slide plate 60, and are held at a fixed, desired length relative to the base plate 44 by welding or securing stops 70 on the guide rods 68 outside of the slide plate 60.

Thus, the spring 64 can be preloaded by compressing the spring by loading the slide plate 60 and securing the stops 70. The spring is then trapped between the base plate 44 and the slide plate 60 at a desired preload. The slide plate 60 has a central bore 72 that slidably receives the end of shaft 50.

Figure 4:
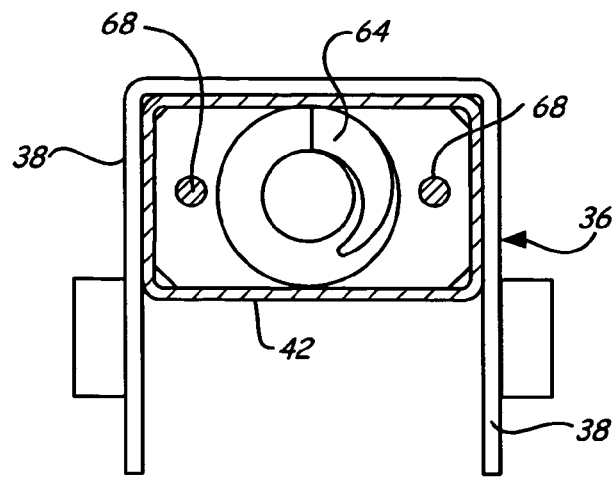
FIG. 4 is a sectional view taken on line 4—4 in FIG. 3.
Figure 7:
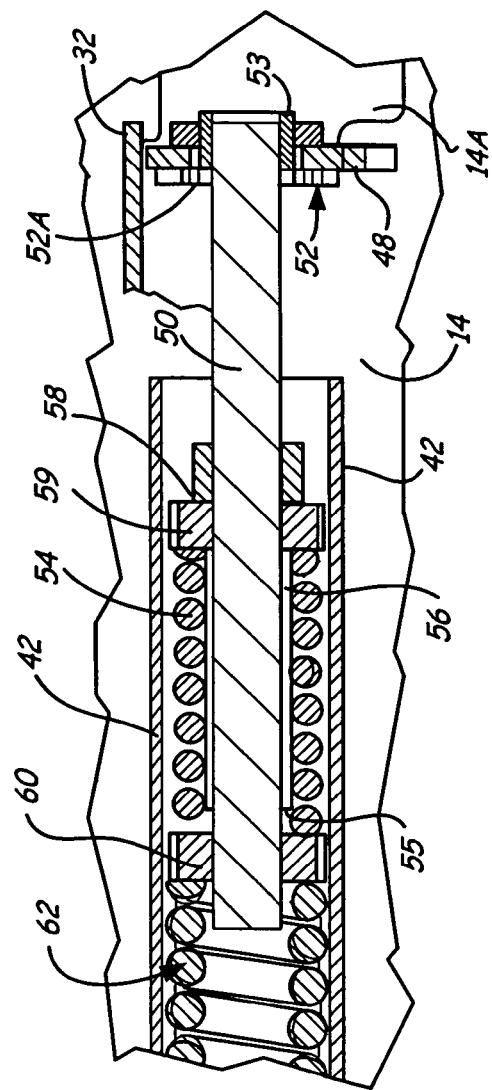
FIG. 7 is an enlarged view of the primary or lower force spring and its mounting relative to the secondary spring.

As can be seen in FIGS. 1, 6 and 7, the shaft 50 is supported by the hub 52, and is prevented from sliding forwardly by force reaction end plate 48. The nut 58 as well as the spring 54 and the sleeve 56 form an assembly. The slide housing 42, carrying the end flanges 38, roller 28 and the spring assembly shown in FIG. 4 can be inserted into the track frame between the guides including the top wall 32 and the guides 34. Side walls 35 are also shown in FIG. 9. The location of the guides 34 is also shown in FIG. 9. The track can then be put onto drive sprocket and rollers. The nut 58 can be threaded along threaded shaft 50 to loosen the spring 54 so the tensioner can be moved and the track can be assembled. Then the nut 58 can be threaded by rotating shaft 50 using hub 52 and hex nut end 53, so it can be tightened to apply a spring force on the tensioning roller 28. Once the initial setting is made, the track will be initially tensioned by force exerted by the lower force spring 54.

It can be seen that once the track load increases tending to retract the spring loaded tensioner and compress spring 54 in the direction as indicated by the arrow 76, the lighter spring 54 will carry the load or resistance until the end surface 55 (FIG. 7) of the tube 56 strikes the slide plate 60, at which time spring 54 will no longer compress, and any further movement of the idler roller 28 in direction as indicated by the arrow 76 will result in compression of the spring 64.

Spring 64 is a very stiff, high load spring, so that the track is loaded to the extent necessary without excessive compression of the springs and resulting movement of the tension roller 28 that would result in loosening the track and perhaps letting it buckle or detrack. The nut 58 is the adjustment that makes the setting for the initial tension on the tension roller 28. The nut 58 is held from rotation by the spring loading rectangular flange or plate 59 in the slide housing 42 and can be adjusted by rotating shaft 50 and hub 52. The circular flange 52A permits the shaft 50 to rotate by using a wrench on the hex end 53. The hex end can be rotated from the exterior in a suitable manner through a side opening 14A in the outer side plate 14. The nut 58 (including flange or plate 59) is pre-set to a desired position on the threaded shaft 50 for preloading first spring 54.

Figure 8:
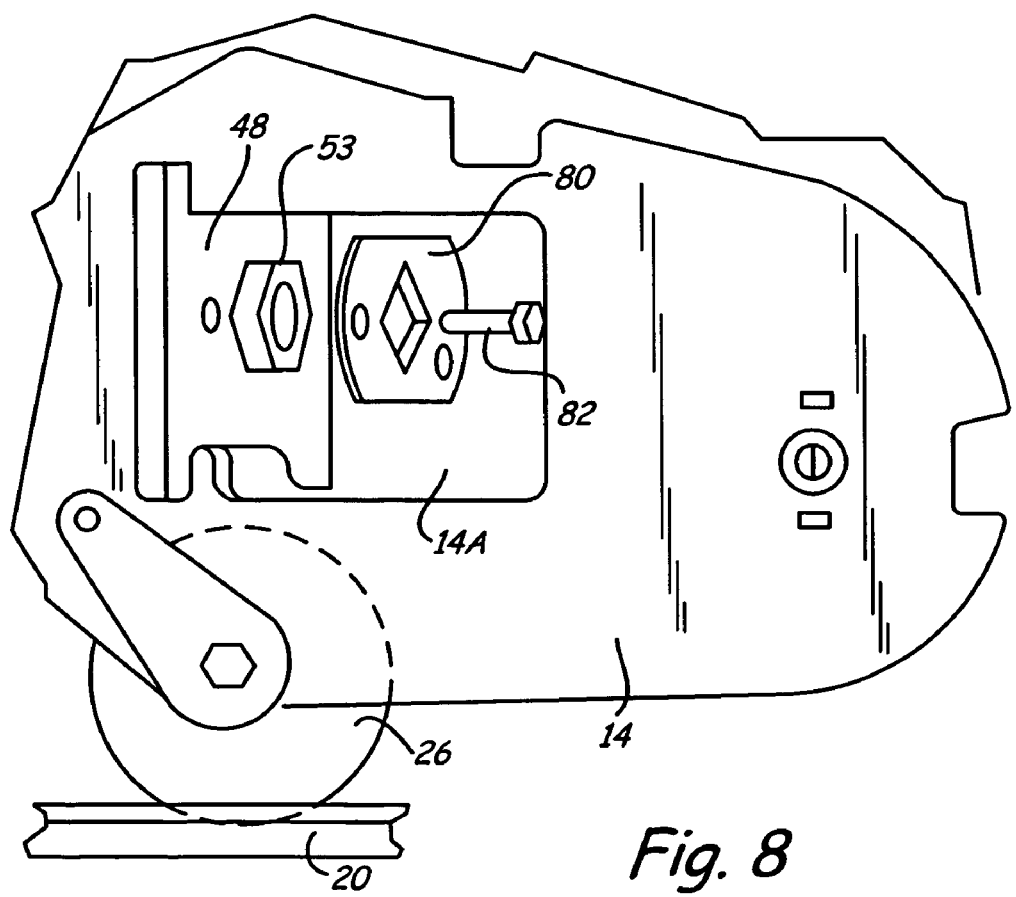
FIG. 8 is a fragmentary perspective exploded view of a lock for the spring adjustment device.

As shown in FIGS. 7 and 8, the hub can be held from rotating by using a lock plate 80 that has an opening of size and configuration to fit over the hex nut 53 of the hub 52. When supported against the front of plate 48 and held in place with a capscrew 82 threaded into a bore in plate 48, the hex nut 53 and hub 52 cannot rotate. Thus, the threaded rod 50 will not rotate to loosen the spring. The spring setting remains constant.

The amount of movement before the end of the sleeve 56 engages the slide plate 60 after adjustment of the spring is relatively small, and in the order of 0.10 inch. For example, the spring 50 can provide a load of approximately 1,200 pounds before the tensioner compresses enough so that the sleeve or spacer 56 strikes the slide plate 60, and then there is a solid compression carrying link between the nut 58 and the slide plate 60, so any further movement of the tensioner in direction of arrow 76 will result in the spring 64 being compressed. The spring 64 initial force is pre-set by adjusting the length of the slide rods 68, and is generally pre-set at 2,000 pounds.

Although the present invention has been described with reference to preferred embodiments, workers skilled in the art will recognize that changes may be made in form and detail without departing from the spirit and scope of the invention.

What is claimed is:

1. A track tensioning device for an endless track on a vehicle having a track frame, said track tensioning device comprising a roller to engage an interior surface of a track, a track tensioner arm supporting the roller, the track tensioner arm including a tubular slide housing, a spring assembly within the tubular slide housing for urging the roller to provide tension in the track comprising first and second compression springs mounted to be loaded in series, the springs being of substantially different spring rates, a first of the springs having a lower spring rate than a second of the springs, a support on the track frame for slidably guiding the tubular housing, a base plate fixed to an end of the tubular housing adjacent the roller, a slide plate slidably mounted in the tubular housing, the second spring being positioned in the tubular housing between the base plate and the slide plate, a force reaction wall mounted on the track frame spaced from an end of the tubular housing opposite from the base plate, the first spring being mounted between the slide plate and the force reaction wall to react spring force to the force reaction wall, a mechanical stop engaging the slide plate as the first spring is compressed by loads on the track tension arm as the slide housing is forced toward the force reaction wall, to prevent loading the first spring more than a selected amount, and thereafter the second spring being compressed between the end plate and the slide plate by increased loads on the track tensioner arm to resist movement of the roller and the slide housing toward the force reaction wall caused by tension in the track.

2. The track tensioning device of claim 1, wherein the mechanical stop comprises a sleeve on an interior of the first spring, said sleeve having an end surface that bears against the slide plate when the first spring is compressed a selected amount.

3. The track tensioning device of claim 1, further comprising a rod mounted in an interior of the first spring and extending slidably through the slide plate, the mechanical stop comprising a sleeve surrounding said rod and positioned on the interior of the first spring, an adjustment nut on the rod bearing against an end of said first spring opposite from the second spring, and said rod being anchored relative to the force reaction wall to react force to the force reaction wall when at least one of the springs is compressed.

4. The track tensioning device of claim 1, further comprising a pair of guide rods fixed to the base plate and slidably mounted through said slide plate, whereby said slide plate can slide along the guide rods when the second spring compresses, and adjustable stops on said guide rods to pre-load the second spring and hold the slide plate in a position with the second spring under a selected compression.

5. A pretensioned spring track tensioning assembly comprising a tensioner arm for mounting a rotating tension roller for engaging a vehicle drive track, said arm having a slide housing attached thereto and extending in a direction away from the mounting for the roller, the slide housing mounting first and second springs end to end, the first and second springs being of different spring rates, the second spring having a first end that is anchored relative to the tensioner arm to prevent the second spring from moving toward the mounting for the roller, and the first spring being mounted adjacent an end of said second spring opposite from the first end of the second spring, a slide plate slidably carried by the slide housing between the adjacent ends of the first and second springs, a guide fixed to the arm adjacent the first end of the second spring and slidably mounting said slide plate and having adjustable stops thereon to provide for compressing the second spring and retaining the second spring at a desired compression, a reaction member engaging an end of the first spring opposite from the second spring and being adapted to be held from axial movement relative to a track frame to react loads on the tensioner arm tending to compress the first and second springs, and a stop member between the reaction member and the slide plate to limit the amount of compression of the first spring when the tensioner arm is loaded in a direction to provide a force against the reaction member.

6. The pretensioned spring assembly of claim 5, wherein said reaction member comprises a shaft, said shaft being mounted in the center of said first spring and slidably extending through said slide plate, and wherein said stop member is carried with said shaft, such that when the first spring has compressed a selected amount the stop member engages the slide plate and further movement of the tensioner arm toward the reaction member loads the second spring through the slide plate and stop member.

7. The pretensioned spring assembly of claim 6, wherein the reaction member further comprises a nut threadably movable on the shaft, the nut having a flange to engage the first spring.

8. The pretensioned spring assembly of claim 7, wherein the shaft is rotatably secured to the track frame.

9. The pretensioned spring assembly of claim 7, wherein the reaction member includes a reaction plate mounted to carry compression loads from the springs to the track frame, the shaft being rotatable relative to the reaction plate.

10. The pretensioned spring assembly of claim 9 and a lock plate to selectively lock the shaft from rotation relative to the reaction plate.

\* \* \* \* \*